(12) United States Patent
Ionescu et al.

(10) Patent No.: US 6,295,289 B1
(45) Date of Patent: Sep. 25, 2001

(54) POWER CONTROL IN A TRANSMITTER

(75) Inventors: Dumitru Mihai Ionescu; Giridhar Mandyam, both of Dallas, TX (US)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/374,573

(22) Filed: Aug. 13, 1999

Related U.S. Application Data
(60) Provisional application No. 60/110,183, filed on Nov. 30, 1998.

(51) Int. Cl.$^7$ .................................................. H04B 7/216
(52) U.S. Cl. ............................ 370/342; 455/69; 455/522
(58) Field of Search ........................... 370/342, 335–341, 370/465, 252, 320; 375/350, 150–156; 455/67.1, 69, 522, 450, 562, 550; 316/130; 341/146, 149, 222, 140

(56) References Cited

U.S. PATENT DOCUMENTS

| | | | |
|---|---|---|---|
| 5,056,109 | 10/1991 | Gilhousen et al. | 375/1 |
| 5,377,225 * | 12/1994 | Davis | 370/342 |
| 5,430,760 | 7/1995 | Dent | 375/200 |
| 5,528,687 * | 6/1996 | Tanaka et al. | 370/286 |
| 5,805,994 | 9/1998 | Perreault et al. | 455/435 |
| 5,809,058 * | 9/1998 | Sato | 370/342 |
| 5,841,768 | 11/1998 | Ozluturk et al. | 370/335 |
| 5,889,827 * | 3/1999 | Bottomley et al. | 370/350 |
| 5,894,473 * | 4/1999 | Dent | 370/342 |
| 5,924,043 * | 7/1999 | Takano | 455/522 |
| 5,990,738 * | 11/1999 | Wright et al. | 330/149 |
| 6,108,565 * | 8/2000 | Scherzer | 455/562 |
| 6,212,174 * | 4/2001 | Lomp | 370/335 |
| 6,243,412 * | 6/2001 | Fukawa | 375/219 |

* cited by examiner

Primary Examiner—Huy D. Vu
Assistant Examiner—Prenell Jones
(74) Attorney, Agent, or Firm—James V. Mahon; Federico Fraccaroli

(57) ABSTRACT

A receiving and transmitting apparatus includes receiver circuitry, sampling circuitry, downlink prediction circuitry, uplink prediction circuitry and gain calculation circuitry. A downlink signal is received at the receiver and sampled at the sampling circuitry. Downlink and uplink prediction circuitry is used to estimate transmission properties of the downlink and uplink signals, respectively. The downlink and uplink prediction circuitry estimates downlink and uplink signal properties based on a sequence of previous downlink signal samples and the uplink estimates, respectively, as well as corresponding sequences of tap coefficients. The gain calculation circuitry is coupled to the uplink predication circuitry and to a transmitter and can set a transmitter gain level based on the predicted uplink signal properties. A method of controlling power in a communication device includes storing a sequence of downlink signal samples, calculating a downlink signal estimate and an uplink signal estimate, and setting a transmission power level based on the estimated uplink signal. The downlink signal estimate is calculated using the sequence of downlink signal samples and a first sequence of tap coefficients. The uplink signal estimate is calculated using a sequence previous uplink signal estimates and a second sequence of tap coefficients.

22 Claims, 4 Drawing Sheets

POWER CONTROL IN A TRANSMITTER

Priority is based on U.S. Provisional application No. 60/110,183, filed Nov. 30, 1998, and entitled "Closed-loop Power Control via Linear Prediction In A Code Division Multiple Access Cellular Wireless System."

BACKGROUND OF THE INVENTION

The invention relates, generally, to power control in radio transmission systems.

FIG. 1 shows a cellular radio communication system. The system 100 includes cells 101-107. Each cell 101–107 includes a radio frequency transmitting and receiving base station 111-117 that allows downlink (base station to mobile unit) and uplink (mobile unit to base station) channels to be established. The uplink and downlink channels provide paths for communication between each mobile unit 120 and an associated base station 111-117. The system 100 may be implemented in accordance with Telecommunications Industry Association standard TIA/EIA IS-95 Mobile Station-Base Station Compatibility Standar ds for Dual-Mode Wideband Spread Spectrum Cellular System ("IS-95") or in accordance with the Japanese Association of Radio Industries and Businesses (ARIB) standard Specification of Mobiles station for 3G Mobile Station System Version 1.0, (3G CDMA) or other wideband CDMA (WCDMA) or multi-carrier CDMA (MC-CDMA) standard. An IS-95 CDMA, 3G CDMA, WCDMA, or MC-CDMA transmission system generally use code division multiple access (CDMA) protocols and quadrature phase shift keying (QPSK) modulation to establish a communication channel between a base station and a mobile receiver.

In a CDMA system, multiple uplink CDMA channels can share the same frequency spectrum. Similarly, multiple downlink channels can share another frequency spectrum. To enable this frequency sharing, each channel's baseband data signal is multiplied by a spreading code which uniquely spreads the channel's data over the entire uplink or downlink transmission spectrum. At a receiver, the unique spreading code assigned to a particular channel is used to despread a received signal and discriminate the desired channel from others occupying the same frequency spectrum. The technique may also be referred to as "spread spectrum" communication.

The use of the same frequency spectrum by multiple CDMA mobile units can increase the bandwidth efficiency of a communications system. However, this spectrum sharing also causes a gradual degradation of the performance of the system as the number of users increases. This gradual degradation occurs because mobile unit receiver s detect signals from other mobile units as noise. In general, the stronger the signal from a mobile unit, the more interference the base station experiences when receiving and demodulating signals from other mobile units. Ultimately, the power from one mobile unit may be great enough to terminate communications of other mobile units. Accordingly, it is extremely important in wireless CDMA communication systems to control the transmission power of all mobile units. In general, transmission power must be controlled both when a mobile unit initiates a channel to a base station, and for the duration of that channel's use.

In an IS-95 implementation, when a mobile unit initiates a CDMA channel with a base station, the mobile unit has not yet received power control information from the base station and, therefore, does not know the power level needed for effective transmission. If the mobile unit begins transmitting at a power level that is too high, it may interfere with the communications of other mobile units and may even terminate the communications of other mobile units. If the initial transmission power level is too low, the mobile unit will not be detected by the base station and a communication link will not be established. To resolve this issue, IS-95 includes a start up protocol whereby a mobile unit begins transmission at a low power level and gradually increases power until a channel is established with the base station.

After the channel has been established, the strength of a radio signal received over that channel may vary due to fades and reinforcements. Channel fading can cause degradation of the received signal and loss of the connection. Reinforcements may cause interference with other transmitters and/or receivers in the mobile radio system. Because of these time varying changes in the radio propagation environment, a mobile unit will need to adjust its transmission power during the use of a channel. To regulate power during use of a channel, a closed-loop power control system can be used. In a closed-loop system, a base station periodically sends power control messages to a mobile unit instructing the mobile unit to increase or decrease its transmission power level. In an IS-95 implementation, the power control messages are sent as a series of power control bits in an overhead portion of a downlink communications channel.

Delay exists between the transmission of a signal from a mobile unit on an uplink channel, the calculation of power control information from that uplink signal at a base station, and the receipt and processing of that power control information back at the mobile unit. In a rapidly varying propagation environment, this delay may result in unsuitable power control information being received and acted upon by the mobile unit. As a result, performance of the mobile unit and/or radio system may degrade. Consequently, improved means of setting a mobile unit's transmission power are desired.

SUMMARY OF THE INVENTION

In general, in one aspect, the invention features a receiving and transmitting apparatus. The apparatus includes receiver circuitry, sampling circuitry, downlink prediction circuitry, uplink prediction circuitry and gain calculation circuitry. A downlink signal is received at the receiver and sampled at the sampling circuitry. Downlink and uplink prediction circuitry is used to estimate transmission properties of the downlink and uplink signals, respectively. The downlink and uplink prediction circuitry estimates downlink and uplink signal properties based on a sequence of previous downlink signal samples and the uplink estimates, respectively, as well as corresponding sequences of tap coefficients. The gain calculation circuitry is coupled to the uplink prediction circuitry and to a transmitter and can set a transmitter gain level based on the predicted uplink signal properties.

In general, in another aspect, the invention features a method of controlling power in a wireless communication device. The method includes storing a sequence of downlink signal samples (which may be derived using a spectral estimation method to compute the first sequence of tap coefficients, for example, by using autoregressive moving average (ARMA) models, or other models to derive the tap coefficients), calculating a downlink signal estimate and an uplink signal estimate, and setting a transmission power level based on the estimated uplink signal. The downlink signal estimate is calculated using the sequence of downlink signal samples and a first sequence of tap coefficients. The uplink signal estimate is calculated using a sequence of previous uplink signal estimates and a second sequence of tap coefficients.

Implementations of the invention may include one or more of the following features. The methods and apparatuses may be implemented in a mobile unit for use in a CDMA cellular phone system. The tap coefficients used for uplink and downlink prediction may be the same or the tap coefficients used for uplink prediction may be derived from those used for downlink prediction. The tap coefficients also may be feedback refined. Downlink signal samples may be determined by sampling a received signal in a downlink CDMA channel. The downlink CDMA channel may include a pilot channel and the received signal samples may be samples of the pilot channel signal envelope (which may be squared after combining different sources of diversity, e.g., multipath). Stored uplink signal estimates may be modified based on power control information received from a base station. The power control information may be in the form of delta modulated power control bits. A transmitter gain setting may be modified by a threshold amount based on the power control bits and/or uplink predictions. The power control information may also be used to forward or backward correct stored uplink signal estimates. Tap coefficients may be updated based on current downlink signal samples. The apparatus' circuitry may be implemented using a software configurable processor.

Implementations may include one or more of the following advantages. Changes in transmitter power levels can be more effectively tracked and controlled. The frequency at which power control messages are exchanged may be reduced. Power control during rapidly varying fading conditions may be improved. Power control during short bursts is facilitated. Prediction of uplink channel energy can be performed locally, at the mobile, thereby reducing or eliminating dependency on power feedback information from the base station. Both base stations and mobile stations may used power control prediction to predict needed transmission power. Implementations may be adapted for use in TDMA, GSM, IS-95, WCDMA, IS-2000, and other cellular phone and radio frequency transmission systems.

Implementations may have other and/or alternative advantages, as will be clear from the description and claims that follow.

DETAILED DESCRIPTION OF THE INVENTION

Figure 1:
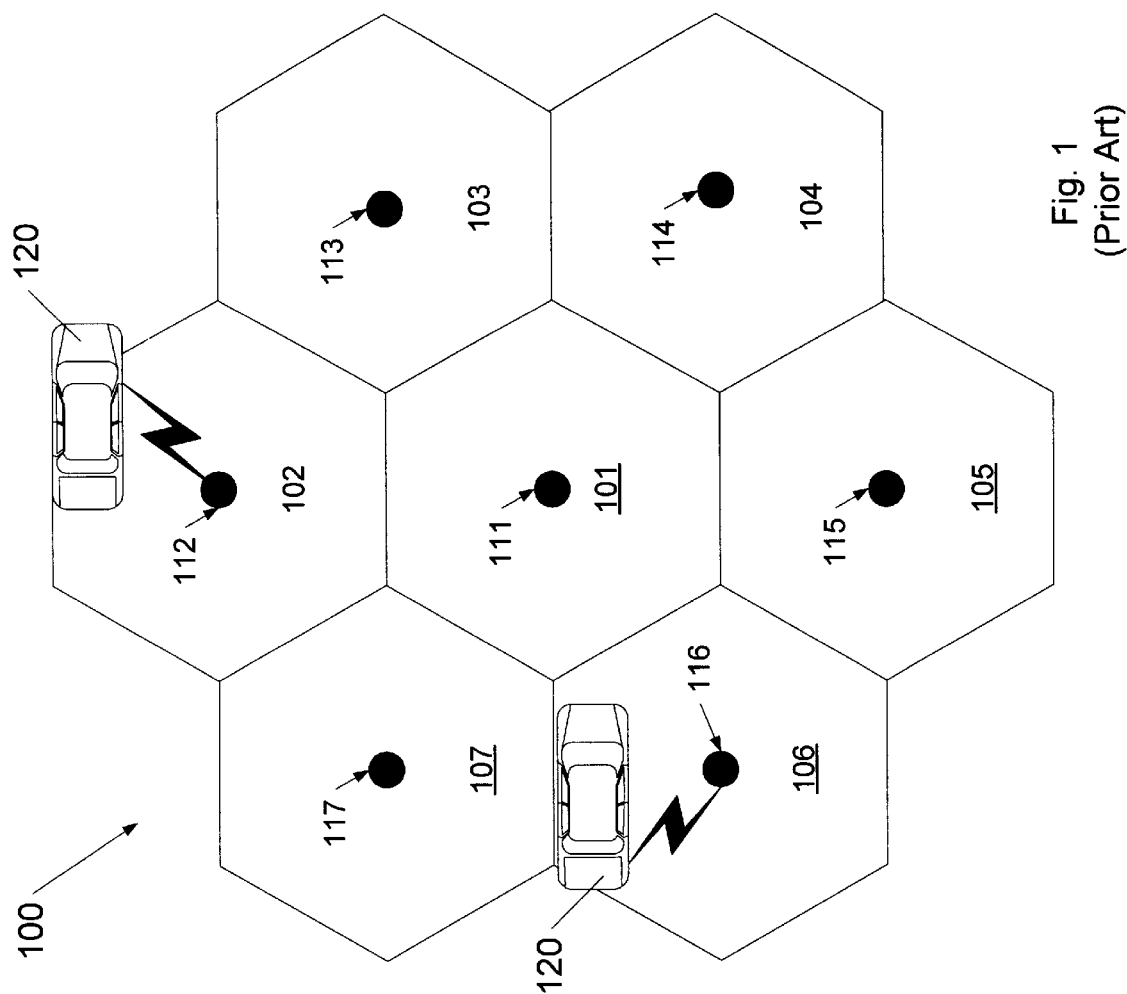
FIG. 1 is a block diagram of a of a mobile communication system.
Figure 2:
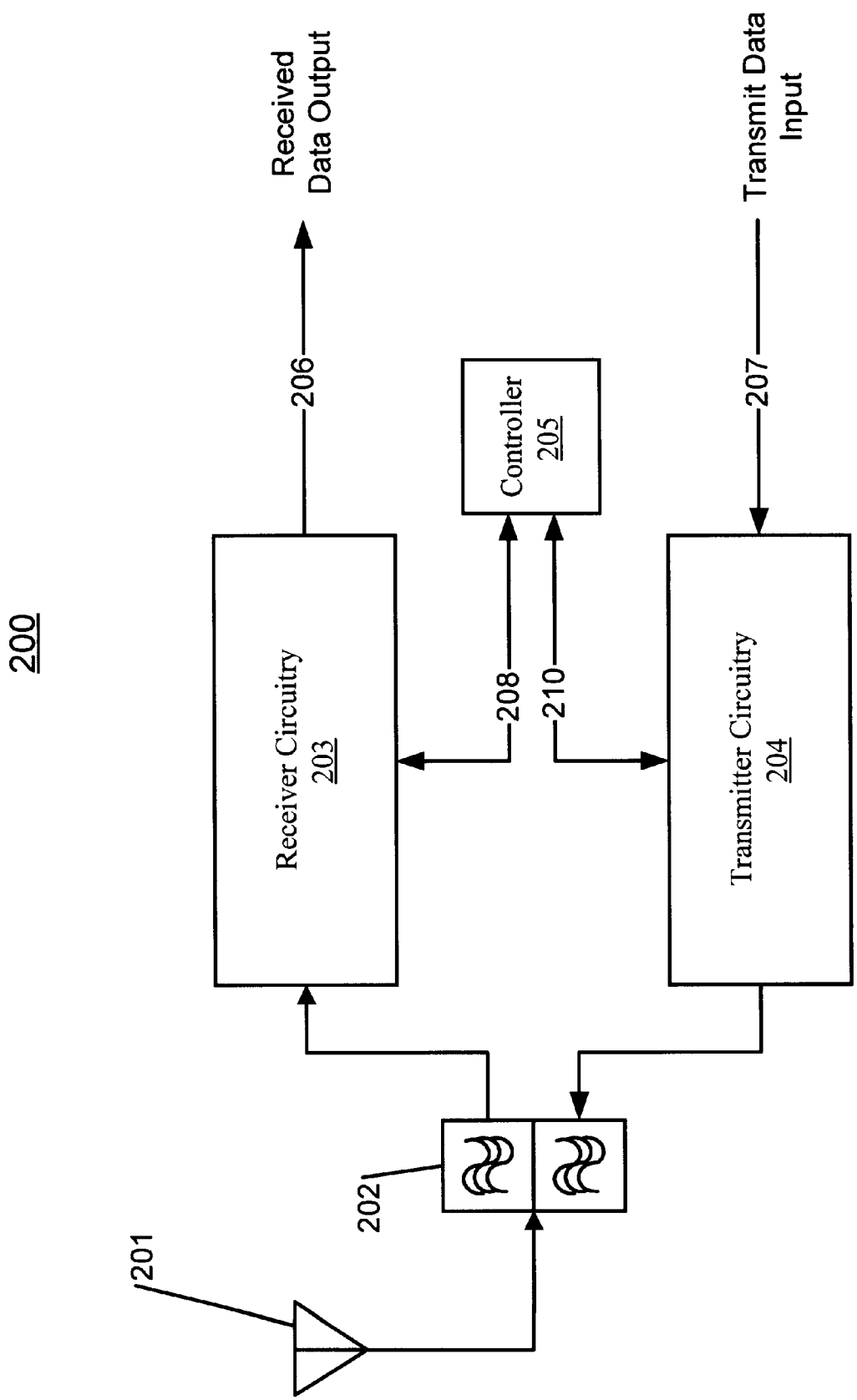
FIG. 2 is a block diagram of receiver and transmitter circuitry.

FIG. 2 is a block diagram showing an exemplary receiver and transmitter (transceiver) circuitry for use in a mobile unit. The transceiver circuitry 200 includes a receiver 203 and a transmitter 204. In a CDMA implementation, the receiver 203 operates to amplify relatively weak downlink signals received at the antenna 201 from a base station 111-117 (FIG. 1), to despread a particular CDMA channel contained in the received downlink signals, and to output a resultant signal 206 containing despread data. For example, the signal 206 may contain a digitized voice signal. Additionally, the receiver outputs a signal 208 to a control processor 205. Control processor 205 may include a microcontroller or microprocessor configured by data in read-only and/or random access memory to control operation of the mobile unit. The signal 208 between the controller 205 and receiver 203 may include spread or despread data, a pilot channel signal, control data, such as power control bits, or other information associated with a received channel.

Circuitry 200 also includes a transmitter 204 coupled to the control processor 205. The control processor 205 may send a signal 210 to control the gain of the transmitter and to control the establishment of channels between the mobile unit and a base station. The circuitry 200 also may include a duplexer 202 that helps to minimize reflections of signals sent by the transmitter section 204 to the antenna 201, from signals sent to the receiver section 203 from the antenna 201. In a typical arrangement, circuitry 200 will be further coupled to voice and data signal processing circuitry. For example, signal 206 may be a despread signal containing digitally encoded voice data received from a base station. The signal 206 can be provided to a voice decoder circuit which converts the encoded voice into an audible form. A mobile unit can also include a voice encoder circuit which can digitally encode sounds received at a microphone and provide the digitally encoded data 207 to the transmitter 204 for CDMA spreading and transmission.

Referring again to FIG. 1, mobile unit 120 communicates with a base station over a two-way communication channel (link). The base-mobile communication channel includes a downlink signal transmitted from a base station 111-117 to a mobile unit 120 and an uplink signal transmitted to the base station 111-117 from the mobile unit 120. In an IS-95 implementation, the downlink signal from the base station includes transmitted data as well as a continuously transmitted pilot code. The pilot code is a spreading code which carries no data bits. The pilot code is used for signal acquisition and synchronization by the mobile unit, as well as for determining the parameters of the adaptive receiver components. In general, a mobile unit 120 must acquire the pilot code signal transmitted by the base station 111-117 before it can receive or transmit other data. Acquisition is the process whereby the mobile unit 120 aligns its locally generated spreading code with the received pilot code. Other CDMA implementations may also use pilot code transmission to synchronize and adapt signal reception devices.

The receiver 203 can receive closed-loop power control information from a base station and provide it to controller 205. The closed-loop power control information may be processed by the controller 205 and used to compute a transmission gain level signal that is provided to transmitter circuitry 204. Controller 205 also includes uplink signal prediction functionality. The uplink signal prediction functionality predicts the signal propagation characteristics of an uplink channel. These predicted uplink channel characteristics supplement closed-loop power control information and are used to further modify transmitter gain levels between subsequent receipts of closed loop power control information.

Figure 3:
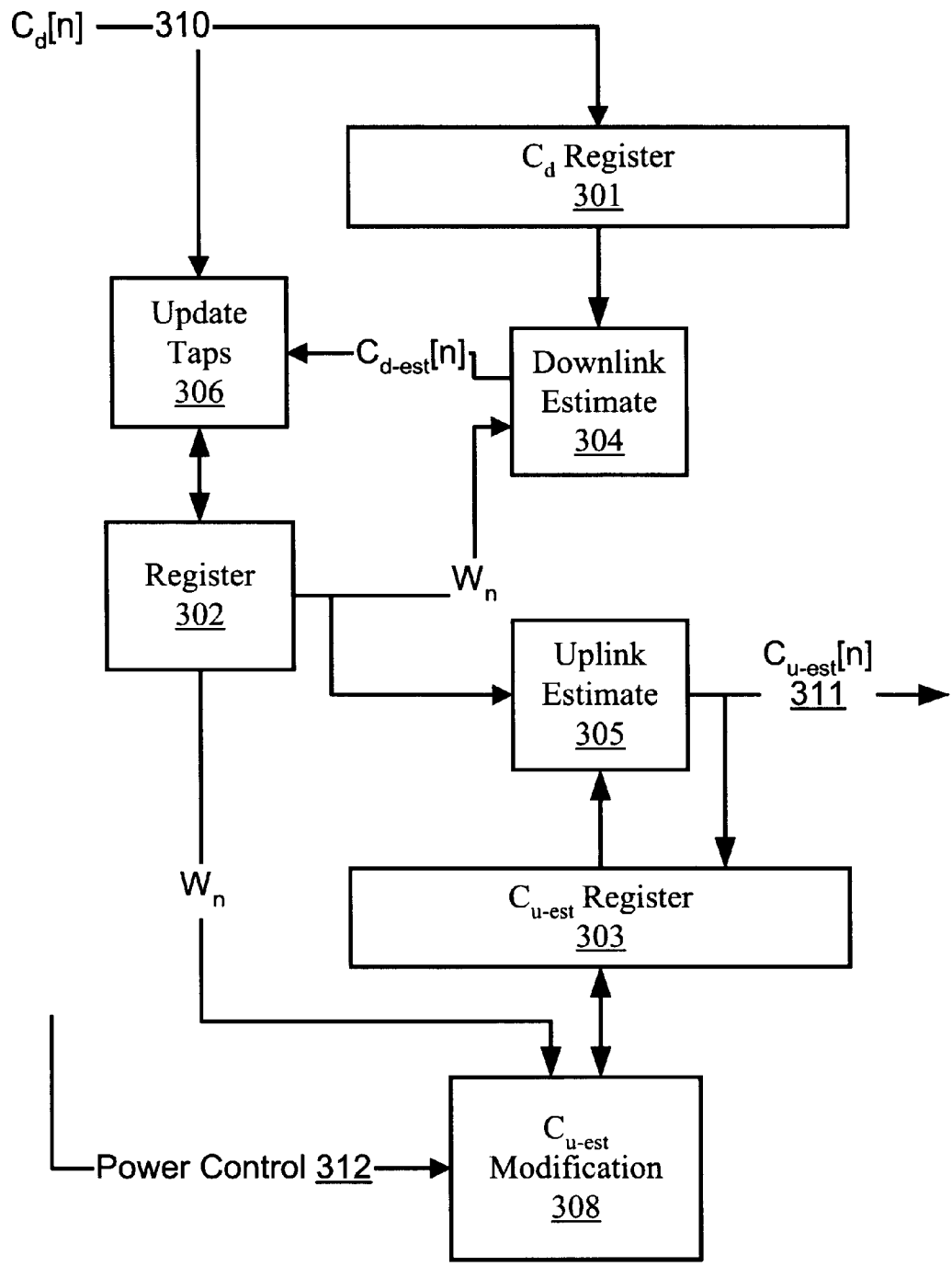
FIG. 3 is a block diagram showing additional details of the circuitry of FIG. 2.
Figure 4:
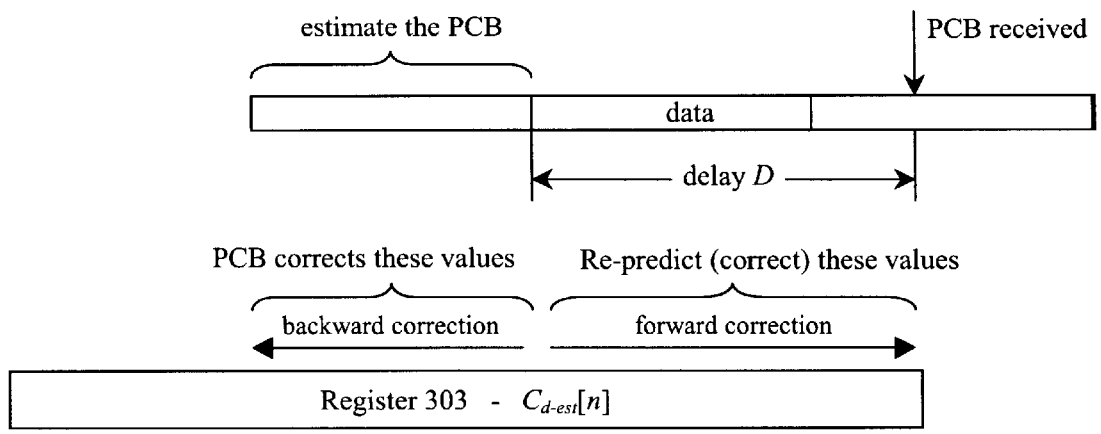
FIGS. 4 and 5 are time line diagrams.

Controller 205 may implement the uplink prediction functionality using dedicated uplink prediction circuitry and/or general purpose processor circuitry. FIG. 3 shows an exemplary implementation in which dedicated circuitry 300 is included in a controller 205 to implement the uplink prediction functions. The uplink prediction circuitry 300 receives a sampled downlink signal strength value $C_d[n]$ 310 over link 208 from the receiver 203. The signal value $C_d[n]$ may be a log-squared envelope value determined by sampling the transmission envelope of a downlink pilot channel at a time nT, followed by squaring the value and taking the logarithm of the result. The circuitry 300 uses values of $C_d[n]$ to determine an output signal 311 that can be used to estimate uplink channel propagation characteristics. The signal 311 may be used by the controller 205 to determine a gain level for the uplink transmitter 204 which is provided to transmitter 204 over link 210.

Circuitry 300 may use autoregressive uplink and downlink channel prediction models to predict signal propagation characteristics of an uplink channel based on the sampled downlink channel value $C_d[n]$. In one implementation, log-squared channel envelope values for both downlink and uplink channels are estimated using an uplink and a downlink autoregressive channel model of order P. The uplink and downlink channel models use a common set of P autoregressive coefficient ("tap") values, and those P tap values are dynamically adjusted using actual downlink log-squared channel envelope values $C_d[n]$. Uplink and downlink channel models may be further refined using power control information received from a base station.

The following algorithm illustrates the uplink prediction function performed by circuitry 300. The uplink prediction algorithm, below, also may be software implemented using a general or special purpose programmable processor.

1) At time n, store a P element downlink sequence vector $C_d$ containing the previous P samples of the downlink signal strength $C_d[n]$. Additionally, store a P element adaptive weight vector $W_n$, and an uplink channel sequence estimation vector $C_{u-est,n}$ such that:
   a) $C_{d,n} = \{C_d[n-1], C_d[n-2], \ldots C_d[n-P]\}$, wherein for $k<0$, $C_d[k]=0$; and
   b) $W_n$ is a P element vector storing autoregressive tap values. At $n=0$, set each element of $W_n$ to an initial value (for example, each element may have an initial value of zero at time $n=0$).
   c) $C_{u-est,n} = \{C_{u-est}[n-1], C_{u-est}[n-2], \ldots C_{u-est}[n-P],\}$, wherein for $k<0$, $C_{u-est}[k]=0$ 2) For each received signal sample $C_d[n]$, compute the predicted downlink channel estimate $C_{d-est}[n]$
   $C_{d-est}[n] = W_n \cdot C_{d,n}^T$,
   where $W_n \cdot C_{d,n}^T$ is the dot-product of the vectors $C_{d,n}$ and the transverse of vector $W_n$.

3) Compute the error E[n] using the sampled downlink signal $C_d[n]$ and the predicted downlink signal $C_{d-est}[n]$:
   $E[n] = C_d[n] - C_{d-est}[n]$ 4) Update each of the P elements of the adaptive weight vector $W_n$ to a new value $W_{n+1}$ such that, for a vector $W_n$ having P elements,
   for $k=1 \ldots P$, $W_{n+1}[k] = W_n[k] + \mu[k]E[n]C_d[n]$,
   where:
     $W_n[k]$ is element number k in the tap vector $W_n$ at time n,
     $W_{n+1}[k]$ is element number k in the tap vector $W_{n+1}$ for use at time n+1,
     $\mu$ is an adaptive filter step size.

As shown in the above formula, the value $\mu$ may differ for each element in the vector $W_n$. The value $\mu$ determines the rate of convergence of the autoregressive algorithm and may be selected experimentally based on the particular operating conditions in which the uplink predictor is to be used. Typically, the value of $\mu$ will be between zero and one. However, in some implementations, and for some positions, k, in the vector $W_n$, negative values and values greater than one may be appropriate. Furthermore, although tap values are shown above as being updated for each new value of n, tap values may be updated at greater intervals; for example new tap values may be computed at times n, n+6, n+12, etc.

5) If closed-loop power control information has been received, update the value of the vector $C_{u-est,n}$. Updating of the vector $C_{u-est,n}$ is further explained, below.

6) Computed the predicted uplink channel signal strength $C_{u-est}[n]$ from the updated tap value vector:
   $C_{u-est}[n] = W_{n+1} \cdot C_{u-est,n}^T$.
   Note that, in some implementations, $C_{u-est}[n]$ may be calculated from the vector
   $W_n$ rather than the vector $W_{n+1}$. This may allow $C_{d-est}[n]$ and $C_{u-est}[n]$ to be calculated in parallel, thereby decreasing $C_{u-est}[n]$ calculation delay.

The implementation of the foregoing algorithm provided by circuitry 300 will now be explained. In the circuitry 300, memory 301 is used to store the vector $C_{d,n}$ which contains P previous samples, $C_d$, of the downlink channel signal. Similarly, memory 302 stores vector $W_n$ which contains P autoregressive weighing values $W_n$, and memory 303 stores the P most-recent uplink channel predictions $C_{u-est}$. Memory 301, 302, and 303 may be provided by shift registers. The downlink channel sample values in memory 301 and the autoregressive tap values in memory 302 are provided to prediction circuitry 304. Prediction circuitry 304 includes multiplication and summing log used to compute the downlink signal strength estimated $C_{d-est}[n]$ from the values in the registers 301 and 302. The value $C_{d-est}[n]$ is calculated according to the formula:

$$C_{d-est}[n] = \sum_{k=1}^{P} w_n[k] C_d[n-k]$$

where
   $C_{d-est}[n]$ is the estimated downlink signal value computed for time n;
   P is the size of the shift register 301;
   $w_n[k]$ are the autoregressive coefficients values stored in the register 302.

Thus, for a value P=3, the circuitry 304 computes the value $C_{d-est}[n]$ as:

$C_{d-est}[n] = w_n[1]C_d[n-1] + w_n[2]C_d[n-2] + w_n[3]C_d[n-3]$

Following the calculation of $C_{d-est}[n]$, the value of the taps (w[k]) in the memory 302 are adjusted by an error signal E[n]. The error signal E[n] may be determined by subtracting the estimated downlink signal value $C_{d-est}[n]$ from the actual downlink signal value $C_d[n]$ using tap updating circuitry 306. The error signal E[n] is used by circuitry 306 to calculate an updated set of tap values $w_{n+1}$. The calculation of the new tap values $w_{n+1}$ is explained below.

The tap values $w_{n+1}$ may then be used to calculate an uplink channel signal estimate $C_{u-est}[n]$. $C_{u-est}[n]$ is calculated by processor circuitry 305 using the tap values in register 302 and the vector $C_{u-est,n}$ which is stored in shift register 303 as a sequence of at least P previous uplink channel estimates $C_{u-est}[n]$. The value of $C_{u-est}[n]$ is calculated according to the formula:

$$C_{u-est}[n] = \sum_{k=1}^{P} w_{n+1}[k] C_{u-est}[n-k]$$

The foregoing formula uses P previously predicted values of $C_{u\text{-}est}[n]$ to calculate a current estimated value of $C_{u\text{-}est}[n]$. Errors in previously predicted $C_{u\text{-}est}[n]$ values may introduce errors in the calculation of a current $C_{u\text{-}est}[n]$ value. However, because actual $C_u[n]$ values are unavailable at the mobile receiver, predicted values are used. To reduce errors arising from the use of previously predicted $C_{u\text{-}est}[n]$ values in the calculation of a current $C_{u\text{-}est}[n]$ value, the previously calculated $C_{u\text{-}est}[n]$ values may be periodically modified based on power control information received from the base station. As explained below, modification of $C_{u\text{-}est}[n]$ values may depend on when power control information was calculated at a base station.

In some implementations, a set of tap values may be used to calculate uplink and downlink channel estimates for more than one sample period, n. For example, a set of tap values may be used for n=6 samples. In such implementations, the tap value vector $W_n$ is only calculated every n=6 time periods.

In an IS-95 implementation, data is sent to a mobile unit in frames that each have a duration of 20 ms. Each IS-95 frame is divided into 16 power control groups of 1.25 ms each. Power control bits are calculated at the base station using received signal strength measurements made during a 1.25 ms power control group. The base station compares a received signal strength for a power control group to a target signal strength, and decides whether the mobile station transmission power needs to be increased or decreased. The power control bits are delta modulated. In other words, each power control bit conveys a simple up or down adjustment by a predetermined threshold amount. Power control bits are transmitted on a downlink fundamental code channel every 1.25 ms (i.e., with a transmission rate of 800 Hz) by puncturing the spread data symbols. The placement of a control bit is randomized within the 1.25 ms power control group. The transmission occurs in the second power control group following the corresponding uplink traffic channel power control group in which the corresponding uplink signal was sampled. Thus, there is up to a 2.5 ms delay between the receipt of an uplink signal containing a power control group and the return of corresponding power control bits to the mobile unit.

Multiple values of $C_{u\text{-}est}[n]$ may be calculated during the time period between reception of an uplink signal (power control group) at a base station and the return of corresponding power control information. Because of such delay, for a given power control bit received at a mobile unit, a subset of the $C_{u\text{-}est}[n]$ values in the register 303 may have been observed at the base station when determining that power control bit, while other $C_{u\text{-}est}[n]$ values may be more recent and, therefore, were not used to affect the uplink signal measured for the currently received power control bits. For example, power control information that is received at the mobile unit at time [n] may have been calculated at the base station based on an uplink power control group whose transmission to the base station ending at time [n-2].

When power control information is received at the mobile unit, each stored $C_{u\text{-}est}$ value may be modified based on whether that value was calculated before or after the base station signal observation interval used to determine the power control information. $C_{u\text{-}est}$ values that were used to modify uplink signals during the base station observation interval corresponding to received power control information may be modified using a backward error correction, while $C_{u\text{-}est}$ values determined after that observation interval may be modified using forward error correction. The $C_{u\text{-}est}$ values that are to be backward corrected may be determined based on the fixed base station delay period between receipt of a power control group and the transmission of corresponding power control bits. In some implementations, other fixed or variable delays may be considered. Alternatively, an appropriate delay value may be experimentally determined. Backward correction uses the received power control information and the stored taps $w_n$ to update the relevant $C_{u\text{-}est}$ values. After backward correction, the backward-corrected values of $C_{u\text{-}est}$ are used to re-predict the remaining $C_{u\text{-}est}$ values and thereby forward-correct those values. For example, referring to FIG. 3, power control information 312 may be modified to uplink prediction modification circuitry 308. The circuitry 308 may contain a processor that can access the stored $C_{u\text{-}est}$ values in memory 303 to backward- and forward-correct the values in the memory 303.

Figure 5:
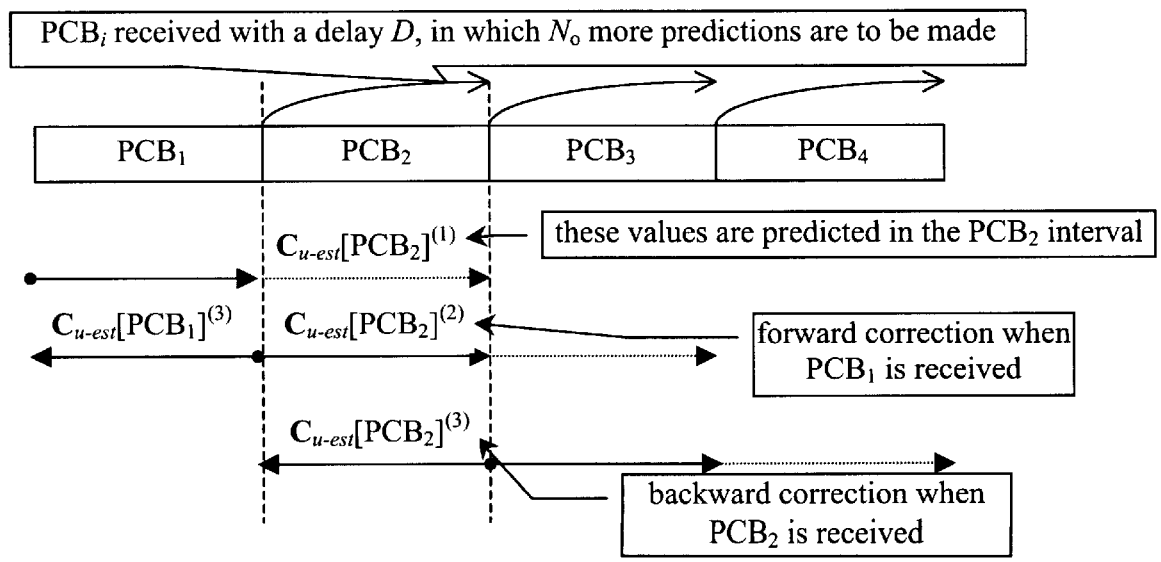

FIG. 5 shows a timeline illustrating application of backward and forward correction in response to the receipt of four power control information messages ($PCB_1 \ldots PCB_4$). In FIG. 5, interval $PCB_i$ is the duration in which the base station makes, based on the received uplink signal, the observations required to subsequently compute the power control bit(s) $PCB_i$. Left and right arrows in FIG. 5 signify backward and forward operations, respectively. Dotted and full lines arrows represent predictions and corrections, respectively. Vector $C_{u\text{-}est}[PCB_i]$ denotes the set of uplink estimates predicted during the base station observation interval $PCB_i$.

Backward and forward correction are now explained with reference to a base station observation interval $PCB_2$.

1) During observation interval PCB2, a subset ($C_{u\text{-}est}[PCB_2]$) of the stored uplink estimates are predicted.
2) At the end of the $PCB_2$ interval, power control information $PCB_1$ is received. Power control information $PCB_1$ allows the subset ($C_{u\text{-}est}[PCB_1]$) of the stored uplink estimates to be backwards corrected (as shown by the left facing arrow in FIG. 5).
3) After the uplink predictions $C_{u\text{-}est}[PCB_1]$ are backward corrected, the uplink prediction estimates in the stored subset $C_{u\text{-}est}[PCB_2]$ are forward corrected.
4) After that, the forward correction of the $C_{u\text{-}est}[PCB_2]$, prediction of the values for the $PCB_3$ interval may be performed. In some implementations, the values of $C_{u\text{-}est}[PCB_2]$ may be saved prior to forward correction. These saved values, rather than the forward corrected values, may be used during a subsequent backward correction occurring during interval $PCB_3$.

Thus, according to the foregoing algorithm, uplink estimates in the PCB interval $PCB_i$ may be subject to three estimation phases: initial prediction may occur during the first phase, forward correction during the second phase, and backward correction during the third phase.

Forward correction may use the same prediction algorithm as used for the initial prediction. However, forward correction predictions may differ from the initial predictions due to changes in other backward-corrected uplink predictions. Backward correction may including adding to $C_{u\text{-}est}[PCB_i]$ a vector u determined using the $PCB_i$ information together with a cost optimization function, such as Wiener filtering. Calculation of the vector u may also be implemented using the following matrix expression:

$$u = PCB_i \frac{\overline{1}(A^{-1})^{-2}}{(\overline{1}A^{-1})(\overline{1}A^{-1})^T}, \quad \text{where } \overline{1} = \begin{bmatrix} 1 \\ \vdots \\ 1 \end{bmatrix}$$

$$A = \begin{bmatrix} 1 & 0 & \cdots & 0 \\ w[1] & 1 & \cdots & 0 \\ w[2] & -w[1] & \vdots & 0 \\ \cdots & \cdots & \cdots & 0 \\ w[N_0-1] & -w[N_0-2] & \cdots & 1 \end{bmatrix}$$

Following the calculation of $C_{u-est}[n]$, the tap value vector $W_n$ stored in register 302 may be replaced by a new tap value vector $W_{n+1}$ that are used to predict $C_{d-est}$ at time n+1. The new tap value vector $W_{n+1}$ is determined by modifying each tap value in the present vector $W_n$ by a sum of a product of a weighted error signal E[n] and the vector $C_d$ in register 301. A different weight value $\mu[k]$ may be applied for each value of the vector $C_d$. Thus, elements $W_{n+1}[k]$ of the new tap value vector $W_{n+1}$ are calculated using the formula:

$$w_{n+1}[j] = w_n[j] + \sum_{k=1}^{P} \mu[k]E[n]C_d[n-k]$$

The taps adjustment can also performed using any other suitable algorithms, like recursive least-square (RLS), Kalman filtering, etc. Other adaptive algorithms may also be used. Exemplary adaptive algorithms may be found in Adaptive Filter Theory by Simon Haykin, Prentice Hall, 1991.

In an IS-95 system, power control information is sent from a base station to a mobile unit as a series of power control bits. The power correction is delta modulated via a power control bit to instruct the mobile unit to increase or decrease transmission power by a predetermined threshold amount. The threshold level may be set using an outer-loop control mechanism. The outer-loop mechanism helps to maintain the robustness of the closed-loop control mechanism by adjusting the system parameters by which the closed-loop controller operates.

In some outer-loop controllers, outer-loop threshold adjustment can only take place after a frame error has been detected. This limits the maximum rate at which threshold adjustments can take place. For instance, in the IS-95 public wireless CDMA standard in which each frame has a duration of 20 milliseconds, the average outer loop adjustment rate is 50 Hz at an assumed frame error rate of 0.1. To improve the robustness of the power control system with respect to a variety of mobile channel conditions (e.g. channel coherence bandwidth, multiple access interference fluctuations, etc.), an increased rate of outer loop adjustments may be desired.

Predictive methods also may be used to increase the rate at which outer loop power control adjustments are made. Prediction may take place by refining the prediction model with the threshold adjustments normally used in frame-based outer loop power control algorithms. For instance, assume that a frame-based outer loop power control algorithm provides the outer loop threshold $(Eb/Nt)_T(j)$ for frame j, and one wishes to predict the threshold at time j+δ, where δ is a duration less than a frame. A prediction of $(Eb/Nt)_T(0)$ at time j+δ can be calculated using a predictor function $f()$ and a vector E containing a sequence of P outer loop adjustment values. That is, vector $E=\{(Eb/Nt)_T(j),(Eb/Nt)_T(j-1), \ldots (Eb/Nt)_T(j-(p-1))\}$. The outer loop estimate at j+δ may now be determined as $(Eb/Nt)_T(j+\delta)=f(E)$ for a causal predictor function. The predictor function $f()$ may be a linear or non-linear predictor. For example, in a linear autoregressive model, the predictor function $f(E)$ may equal $E \cdot A^T$, where $E \cdot A^T$ is the dot product of the vector E and of a vector A containing autoregressive coefficients. This function may also be expressed as the function:

$$(E_b/N_t)_T(j+\delta) = \sum_{k=0}^{P-1} a_k(\delta)(E_b/N_t)_T(j-k),$$

function is P.

Outer loop prediction may be implemented using algorithms and circuitry similar to those discussed with respect to closed loop prediction.

The invention has been described within the context of an IS-95 compatible mobile phone receiver. However, the invention may be used in non-IS-95 mobile phone systems, home wireless phone systems, and with other types of transmission systems. For example, the disclosed predictor may be used in 3G CDMA, WCDMA, MC-CDMA, 900 MHz wireless home phone equipment, wireless local area networking equipment, CDMA and phase shift modulation systems operating over copper pair interconnections, and other transmission systems. Furthermore, although an exemplary predictive link power control system implemented at a mobile unit has been given, in some systems, base station implementations also may be used. Still other changes may be made. For example, although the use of power control commands containing a single delta-modulated power control bit is discussed, the use of multiple bits to provide additional control is within the scope of the invention. Additionally, implementations may estimate the tap coefficients using spectral estimation methods.

The invention may be implemented using analog electronic circuitry, digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors and digital signal processors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices which may be implemented as separate devices or integrated with a processor. Any of the fore(going may be supplemented by, or incorporated in, specially-designed ASICs (application-specific integrated circuits).

Still other embodiments are within the scope of the following claims.

What is claimed is:

1. A receiving and transmitting apparatus comprising:

receiver circuitry configured to receive a downlink signal;

sampling circuitry operatively coupled to the receiver circuitry and configured to sample the downlink signal;

downlink prediction circuitry coupled to the sampling circuitry to calculate an downlink signal estimate based on a sequence of previous downlink signal samples and a first sequence of tap coefficients;

uplink prediction circuitry to calculate an uplink signal estimate based on a stored sequence of previous uplink signal estimates and a second sequence of tap coefficients; and gain calculation circuitry operatively coupled to the uplink prediction circuitry and a transmitter, the gain calculation circuitry being configured to determine a transmitter gain setting based on the uplink signal estimate.

2. A mobile unit for use in a code division multiple access cellular phone system comprising the apparatus of claim 1.

3. The apparatus of claim 1 wherein the second sequence of tap coefficients is derived from the first sequence of tap coefficients.

4. The mobile unit of claim 3, wherein the first and second sequences of tap coefficients are the same.

5. The apparatus of claim 1 wherein:

the downlink signal comprises a CDMA channel; and each downlink signal sample in the sequence of previous downlink signal samples comprises a value determined at the sampling circuitry by sampling a received signal strength associated with the downlink CDMA channel.

6. The apparatus of claim 5 wherein the downlink CDMA channel comprises a pilot channel and sampling a received signal comprises sampling a signal envelope associated with the pilot channel.

7. The apparatus of claim 1 wherein the downlink signal comprises power control information and the apparatus further comprises circuitry to modify the stored sequence of previous uplink signal estimates based on the power control information.

8. The apparatus of claim 7 wherein the power control information comprises a delta modulated power control bit and wherein the apparatus further comprises:

circuitry to modify the transmitter gain setting by a threshold amount based on the power control bit; and circuitry to predictively alter the threshold amount based on a previous threshold adjustment.

9. The apparatus of claim 7, wherein the circuitry to modify the stored sequence of previous uplink signal estimates comprises circuitry to backward-correct uplink signal estimates associated with the received power control information and circuitry to forward-correct other uplink signal estimates.

10. The apparatus of claim 1 further comprising tap coefficient update circuitry configured to modify the first sequence of tap coefficients as a function of the downlink signal estimate and a current downlink signal sample.

11. The apparatus of claim 10 wherein the downlink prediction circuitry, uplink prediction circuitry, and tap coefficient update circuitry comprise a software configurable processor.

12. A method of controlling power in a wireless communication device, the method comprising:

sampling a received downlink signal;

storing a sequence of downlink signal samples;

calculating a downlink signal estimate based on the sequence of downlink signal samples and a first sequence of tap coefficients;

calculating an uplink signal estimate based on a second sequence of tap coefficients and a sequence of previous uplink signal estimates; and setting a transmission power level based on the uplink signal estimate.

13. The method of claim 12 wherein the first sequence of tap coefficients and the second sequence of tap coefficients are the same.

14. The method of claim 12 further comprising:

updating the first sequence of tap coefficients based on a current downlink signal sample and the downlink signal estimate.

15. The method of claim 14 wherein the second sequence of tap coefficients comprise the updated first sequence of tap coefficients.

16. The method of claim 12 further comprising receiving power control information from a remote station and updating the sequence of previous uplink signal estimates based on the received power control information.

17. The method of claim 16 wherein updating based on the received power control information comprises determining a subset of the sequence of previous uplink signal estimates corresponding to signal estimates associated with a transmitted signal monitored to determine the received power control information.

18. The method of claim 16 further comprising modifying the transmission power level based on the received power control information.

19. The method of claim 18 wherein the power control information comprises a delta modulated power control bit, modifying the transmission power level based on the received power control information comprises modifying by a threshold amount, and wherein the method further comprises modifying the threshold amount based on a sequence of previous threshold modifications.

20. The method of claim 12 wherein the downlink signal comprises a pilot channel and the downlink signal samples comprise a pilot channel envelope sample.

21. The method of claim 20 wherein the pilot channel envelope sample comprises a envelope signal strength sample.

22. The method of claim 12 wherein the wireless communications device is a time division multiple access cellular phone.

* * * * *